US007051022B1

(12) United States Patent
Faisal

(10) Patent No.: US 7,051,022 B1
(45) Date of Patent: May 23, 2006

(54) AUTOMATED EXTENSION FOR GENERATION OF CROSS REFERENCES IN A KNOWLEDGE BASE

(75) Inventor: Mohammad Faisal, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1033 days.

(21) Appl. No.: 09/742,809

(22) Filed: Dec. 19, 2000

(51) Int. Cl.
*G06F 17/30* (2006.01)

(52) U.S. Cl. .................................. 707/5; 707/4; 707/6

(58) Field of Classification Search ..................... 707/5, 707/1, 2, 3, 4
See application file for complete search history.

(56) References Cited

U.S. PATENT DOCUMENTS

| | | | | |
|---|---|---|---|---|
| 5,884,305 A | * | 3/1999 | Kleinberg et al. | 707/6 |
| 5,930,788 A | * | 7/1999 | Wical | 707/5 |
| 5,953,718 A | * | 9/1999 | Wical | 707/1 |
| 6,026,388 A | * | 2/2000 | Liddy et al. | 707/1 |
| 6,064,971 A | * | 5/2000 | Hartnett | 706/45 |
| 6,125,395 A | * | 9/2000 | Rosenberg et al. | 709/228 |

* cited by examiner

*Primary Examiner*—Charles Rones
*Assistant Examiner*—Neveen Abel-Jalil
(74) *Attorney, Agent, or Firm*—Stattler, Johansen & Adeli LLP

(57) ABSTRACT

A technique for generating cross-references among categories in a knowledge base extracts a plurality of themes from a corpus of documents. A theme identifies subject matter contained in a corresponding document. A plurality of scores are generated such that each score identifies a relative theme strength among theme pairs of the themes extracted from the documents. In general, a theme strength reflects the amount of subject matter contained in a document for a corresponding theme relative to other themes in the document. Thereafter, the most related theme pairs are selected as indicated by the scores. Category pairs of the knowledge base are then selected by mapping the themes of the selected theme pairs to corresponding categories of the knowledge base. A cross-reference between categories of the category pairs in the knowledge base is generated so as to identify an association between the category pairs.

15 Claims, 7 Drawing Sheets

[Y Designates Theme In Column]

|          | Ty(0) | Ty(1) | Ty(2) | Ty(3) | Ty(4) | . | . | . | Ty(n-1) |
|----------|-------|-------|-------|-------|-------|---|---|---|---------|
| Tx(0)    | X     |       |       |       |       |   |   |   |         |
| Tx(1)    | S     | X     |       |       |       |   |   |   |         |
| Tx(2)    | S     | S     | X     |       |       |   |   |   |         |
| Tx(3)    | S     | S     | S     | X     |       |   |   |   |         |
| Tx(4)    | S     | S     | S     | S     | X     |   |   |   |         |
| .        | S     | S     | S     | S     | S     | X |   |   |         |
| .        | S     | S     | S     | S     | S     | S | X |   |         |
| Tx(n-1)  | S     | S     | S     | S     | S     | S | S | X |         |

[X Designates Theme In Row]

AUTOMATED EXTENSION FOR GENERATION OF CROSS REFERENCES IN A KNOWLEDGE BASE

BACKGROUND OF THE INVENTION

1. Field of the Invention

The present invention is directed toward the field of knowledge base systems, and more particularly towards automatically extending cross references in a knowledge base based on a corpus of documents.

2. Copyright Notice

This application contains material subject to copyright protection. The copyright owner has no objection to the facsimile reproduction of this material as it appears in the United States Patent and Trademark Office files or records, but otherwise reserves all copyright rights whatsoever.

3. Art Background

An information retrieval system attempts to match user queries (i.e., the users statement of information needs) to locate information available to the system. In general, the effectiveness of information retrieval systems may be evaluated in terms of many different criteria including execution efficiency, storage efficiency, retrieval effectiveness, etc. Retrieval effectiveness is typically based on document relevance judgments. These relevance judgments are problematic since they are subjective and unreliable. For example, different judgment criteria assigns different relevance values to information retrieved in response to a given query.

There are many ways to measure retrieval effectiveness in information retrieval systems. The most common measures used are "recall" and "precision." Recall is defined as the ratio of relevant documents retrieved for a given query over the number of relevant documents for that query available in the repository of information. Precision is defined as the ratio of the number of relevant documents retrieved over the total number of documents retrieved. Both recall and precision are measured with values ranging between zero and one. An ideal information retrieval system has both recall and precision values equal to one.

Some information retrieval tools, such as Oracle® Corporation's interMedia Text, use a lexicon in order to improve precision and recall. The lexicon consists of a very large repository of language specific words/phrases, their corresponding parts of speech information, and their relationships to each other. These lexicons are mostly language dependent and are manually constructed. A typical lexicon contains about half a million words/phrases for the English language. The process of manually establishing relationships between such large numbers of words is time consuming.

Typically, the entries in these lexicons are arranged in a tree shaped hierarchy. Some relationships for a hierarchical lexicon include parent—child and child—parent relationships. In addition, another relationship establishes the associations between any two words in the lexicon. For purposes of nomenclature, this relationship is referred to as a "cross reference relationship." In general, cross references may be characterized as links between two different nodes or words within a hierarchical tree structure. In some manifestations, these cross reference relationships include an associated weight to indicate the strength with which the two nodes are related.

Since lexicons are manually constructed, the words and phrases within them cannot possibly span all areas of interest and knowledge. This is especially true when it comes to new knowledge and terminology. In addition, the cross reference relationships within one area of interest may be drastically different from another area of interest. Thus, there are two problems associated with generating cross references among words in a lexicon. First, a problem exists as to how to establish cross reference relationships with words not already present in the lexicon, even though these relationships are pertinent to a dataset (i.e., documents) under analysis. A second problem exists as to how to establish new cross references within existing words based on the specific usage of words in the data set under analysis. A system that solves these problems leads to improve precision and recall for use in information retrieval systems.

SUMMARY OF THE INVENTION

A system generates cross-references among categories in a knowledge base. A plurality of themes are extracted from a corpus of documents. A theme identifies subject matter contained in a corresponding document. The system generates a plurality of scores such that each score identifies a relative theme strength among theme pairs of the themes extracted from the documents. In general, a theme strength reflects the amount of subject matter contained in a document for a corresponding theme relative to other themes in the document. Thereafter, the most related theme pairs are selected as indicated by the scores. Category pairs of the knowledge blase are then selected by mapping the themes of the selected theme pairs to corresponding categories of the knowledge base. A cross reference between categories of the category pairs in the knowledge base are generated so as to identify an association between the category pairs.

BRIEF DESCRIPTION OF THE DRAWINGS

FIG. 3 illustrates one embodiment for implementing the theme matrix for use in automated cross reference generation.

DETAILED DESCRIPTION

Figure 1:
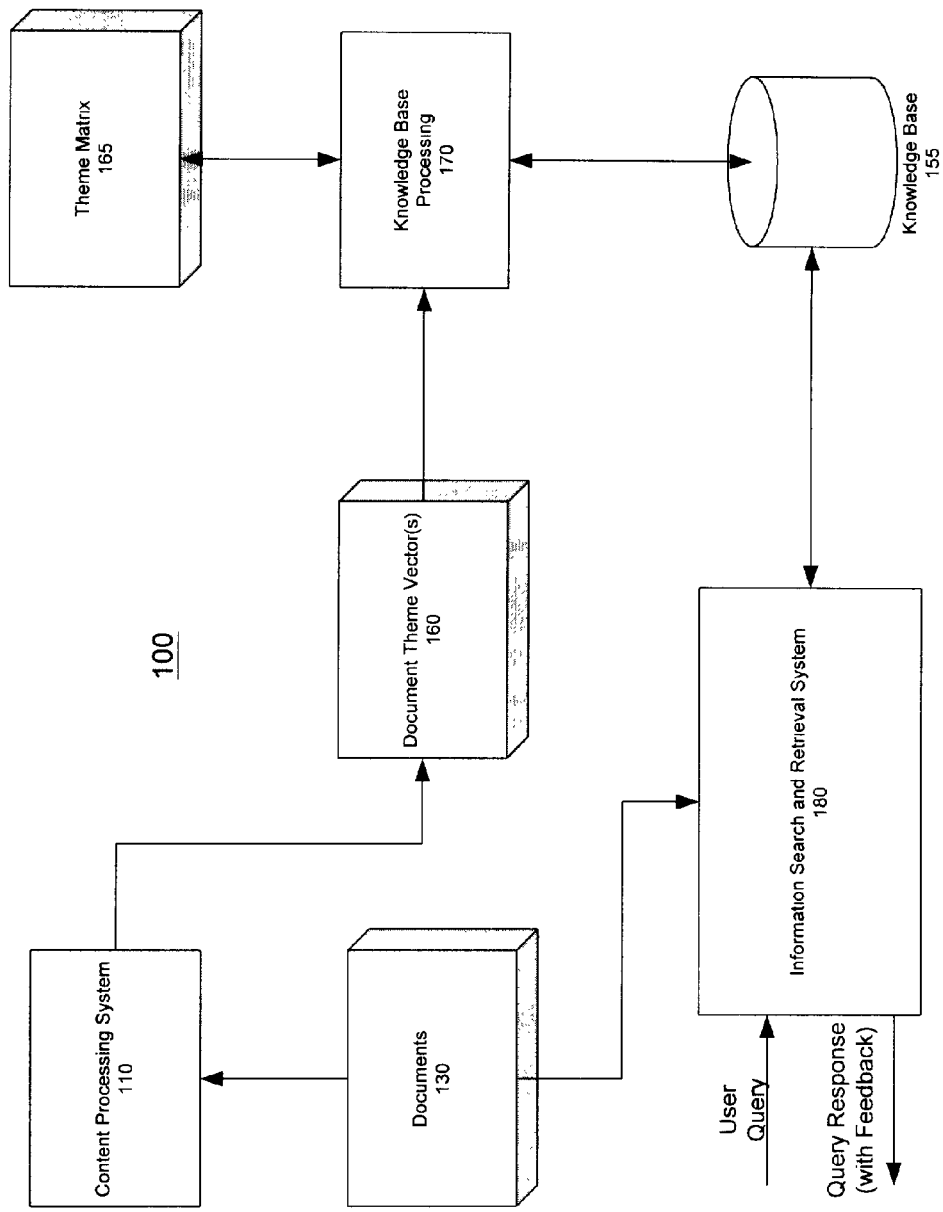
FIG. 1 is a block diagram illustrating one embodiment for knowledge base processing of the present invention.

Knowledge Base Processing System:

FIG. 1 is a block diagram illustrating one embodiment for knowledge base processing of the present invention. In general, a knowledge base processing system 100 operates on a corpus of documents, labeled documents 130. In general, a knowledge base 155 comprises a plurality of nodes of terminology, arranged hierarchically, that reflect associations among the terminology. The nodes of terminology consist of concepts and general categories, and the cross-references of the knowledge base reflect associations between certain nodes. Also, in one embodiment, the cross-references have a corresponding strength to indicate the strength of the association between the two nodes. In general, the knowledge base processing system 100 augments the knowledge base 155 by automating the process of generating additional cross-references among the nodes of terminology in the knowledge base 155. The documents 130 may include a compilation of information from any source. For example, the documents 130 may be information stored on a computer system as computer readable text. Also, the documents 130 may be accessed via a network, and stored at one or more remote locations. The content of the documents 130 may include articles, books, periodicals, etc.

The knowledge base processing system 100 includes, to process the corpus of documents 130, a document content processing system 110. Specifically, a content processing system 110 analyzes the documents 130 to generate a document theme vector 160. In general, the document theme vector 160 presents a thematic profile of the content of each document. The themes generally correspond to concepts and categories in the knowledge base (i.e., nodes of terminology). A further discussion of the document theme vector is described more fully below in the section "Content Processing System."

For this embodiment, the knowledge base processing 170 receives the document theme vectors 160, and generates a relative theme strength for the theme vectors. The theme pairs are used to form a theme matrix 165. The knowledge base processing 170 includes a form of cluster processing. In general, this cluster or matrix processing determines relative theme strengths for theme pairs identified in the theme matrix 165. Based on these relative theme strengths, the theme pairs most related are selected. The knowledge base processing 170 then augments the cross references in the knowledge base 155 based on the theme pairs most related.

As shown in FIG. 1, the knowledge base processing system 100 optionally includes information search and retrieval system 180. The information search and retrieval system 180 receives, as input, user queries, and generates, as output, query responses with feedback. In general, the feedback provides to the user additional terms, related to the user query, to facilitate the user in re-formulating the query. For this embodiment, the information search and retrieval system 180 accesses documents 130 and knowledge base 155 to formulate a response to the user query. One embodiment for generating a query response is described in U.S. patent application Ser. No. 08/861,961, entitled "A Document Knowledge Base Search and Retrieval System", filed May 21, 1997, Inventor Kelly Wical, which is expressly incorporated herein by reference.

In one embodiment, the information search and retrieval system 180 generates, as feedback to the user, hierarchical query feedback terms. The information search and retrieval system 180 extracts terms, as query feedback terms, from the knowledge base 155 based on associations between the user query terms and terminological nodes of the knowledge base 155. The query feedback terms are referred to as "hierarchical" query feedback terms because the associations are based on the hierarchy of terminological nodes of the knowledge base 155. One embodiment for generating hierarchical query feedback terms is described in U.S. Pat. No. 6,094,652, issued Jul. 25, 2000, entitled "Hierarchical Query Feedback In An Information Retrieval System", filed Jun. 10, 1998, inventor Mohammad Faisal, which is expressly incorporated herein by reference.

The designation of cross references in a knowledge base has further application for use in "theme proving." In general, a natural language processing system identifies the overall content of a document (identifies themes of the document), and the role of theme proving is to determine whether those themes selected are valid. In one embodiment for theme proving, the cross reference information is used to assign a lower score to some themes and designate a higher score to other themes.

Figure 2:
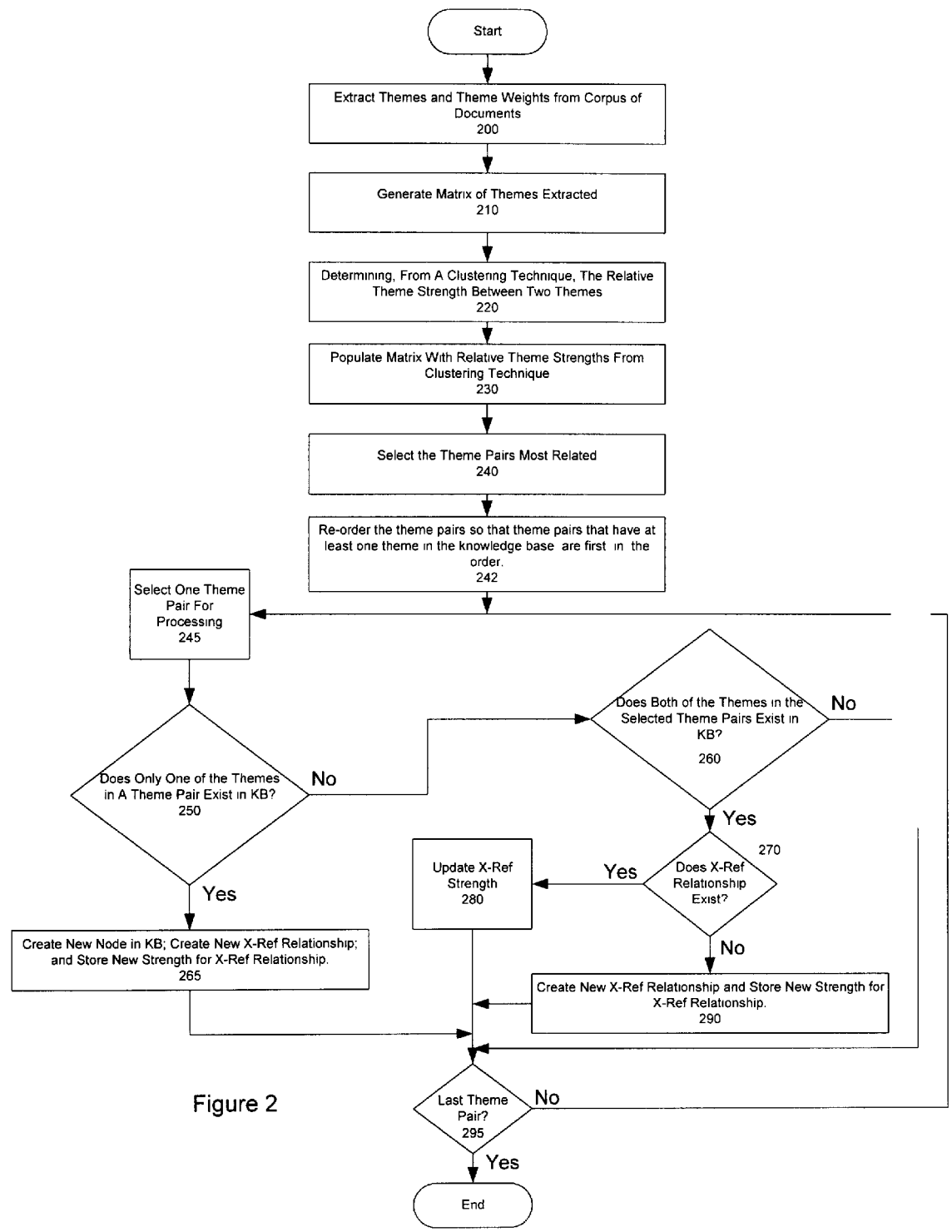
FIG. 2 is a flow diagram illustrating one embodiment for the knowledge base processing of the present invention.

FIG. 2 is a flow diagram illustrating one embodiment for the knowledge base processing of the present invention. As shown in block 200, themes and theme weights are extracted from the corpus of documents 130, to generate the document theme vectors 160. A theme matrix 165 (FIG. 1) is generated for the extracted themes (block 210, FIG. 2). In general, a theme matrix, defined as A, consists of "x" rows of distinct themes from the document theme vectors 160 and "y" columns of those same themes. The diagonal of the matrix is not used. In general, the theme matrix provides tabular data to show how closely two theme pairs are semantically or linguistically related. The theme matrix is described more fully below in conjunction with a discussion of FIGS. 3 and 4.

The knowledge base processing 170 (FIG. 1) determines the relative theme strength between each two themes in the theme matrix (block 220, FIG. 2). The matrix, A, is populated with the relative theme strengths calculated in the clustering technique (block 230, FIG. 2). From these relative theme strengths, the theme pairs that are most related (i.e., the theme pairs that have the highest relative theme strengths) are selected (block 240, FIG. 2).

The theme matrix stores the strength with which any two themes are related to each other. From the theme matrix, the automated cross reference generation technique selects the most strongly related pairs of themes. In one embodiment, the selection of theme pairs is implemented by designating a threshold on the strength with which two themes are related. This threshold may be generated any number of ways. In one embodiment, for each theme, the top "z" related themes are selected, where z is an integer value. In another embodiment, for each theme, all related themes that are related with a strength greater or equal to some percentage of the mean or medium of all strengths for that theme are selected. However, any technique to select theme pairs with the strongest associations may be used without deviating from the spirit or scope of the invention.

Theme pairs selected (block 240, FIG. 2) are reordered starting with those theme pairs that contain at least one theme from the knowledge base (block 242, FIG. 2). One theme pair, as ordered, is selected for processing (block 245, FIG. 2). As shown in FIG. 2, if only one of the themes in the theme pair exist as terminology nodes in the knowledge base, then: a new terminology node, corresponding to the theme that does not exist in the knowledge base, is created in the knowledge base; a new cross-reference relationship is generated between the new terminology node and the existing terminology node; and the knowledge base is augmented to store the new relative theme strength for the cross-referenced relationship (blocks 250 and 265, FIG. 2). If both of the themes in the theme pairs exist as terminology nodes in the knowledge base, then a further inquiry is made as to whether the cross-reference relationship exists between the two nodes (blocks 260 and 270, FIG. 2). If the cross-reference relationship between the terminology nodes for the theme pair does exist, then the cross-reference strength for the two nodes is updated (block 280, FIG. 2). Alternatively, if the cross-reference relationship does not exist, then a new cross-reference relationship between the two nodes is created, and the new relative theme strength for the cross-reference relationship is stored (block 280, FIG. 2). If another theme pair exists for processing, then control is transferred to block 245 to process another theme pair (block 295, FIG. 2).

FIG. 3 illustrates one embodiment for implementing the theme matrix (e.g., theme matrix 165, FIG. 1) for use in automated cross-reference generation. The matrix 300 consists of a plurality of rows and columns. Each row is designated by an integer value for the variable, "x" (i.e., 0, 1, 2, 3, 4 . . . n−1). Similarly, each column is designated by an integer value for the variable, "y" (i.e., 0, 1, 2, 3, 4 . . . n−1), wherein "n" is the number of distinct themes in a set of themes. Each "x" designation in a row corresponds to a distinct theme in a set of themes, and each "y" designation in a column corresponds to a distinct theme in the same set of themes. For the example of FIG. 3, the first theme in the first row, designated Tx(0), is the same theme as the theme, Ty(0), designated in the first column. The intersection in matrix 300 for a given row and a given column form a matrix entry. These entries provide an organization to store scores that depict the relationships between themes in the corresponding row and column. In general, a score represents a relative strength or weight for association between a theme pair (i.e., Ty and Tx). For example, the entry for Ty(0) and Tx(1) represents the relative strength for the association between $Theme_0$ and $Theme_1$. The "S" stored in an entry in FIG. 3 represents the storage of a score for that entry. Note that only half the matrix is populated with scores of "S." This is because the relationship between $Theme_0$ and $Theme_1$ is the same as relationship between $Theme_1$ and $Theme_1$. The theme matrix of FIG. 3 also stores an "X" in all entries located on the diagonal of the matrix. This is because there is no relationship to depict an association between the same theme.

Figure 4:
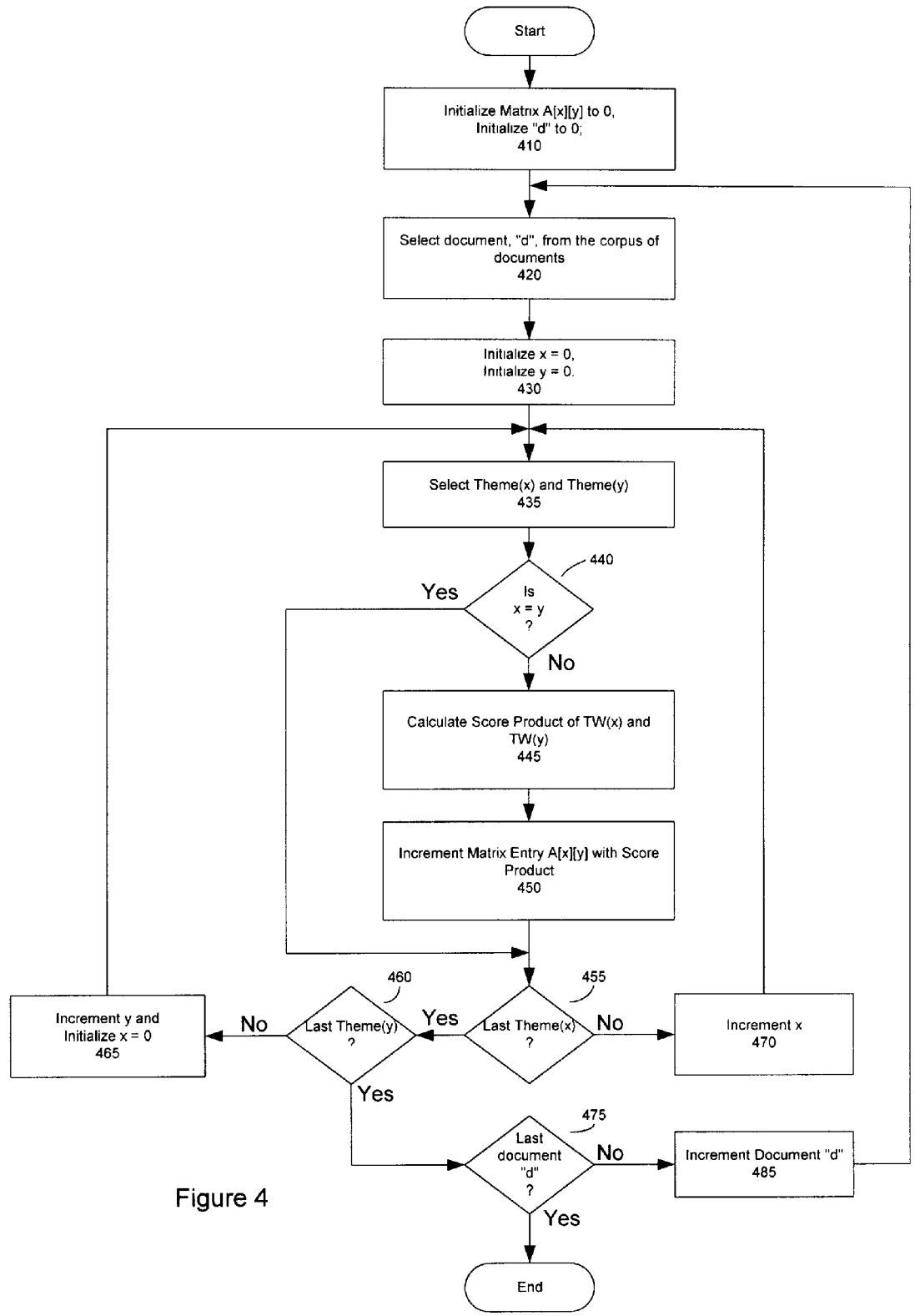
FIG. 4 is a flow diagram illustrating one embodiment for calculating scores for the theme matrix.

FIG. 4 is a flow diagram illustrating one embodiment for calculating scores for the theme matrix. The entries of the theme matrix, A[x][y], and a variable "d" to designate the documents in the dataset are initialized (block 410, FIG. 4). A document, designated by the variable "d", is selected from the corpus of documents for analysis (e.g., d=0) (block 420, FIG. 4). The variables to identify the rows and columns of the matrix (i.e., x and y) are initialized to zero (block 430, FIG. 4). A first theme is selected based on the row variable, "x", and a second theme is selected based on the column variable, "y" (block 435, FIG. 4). If x is equal to y, then the two themes designated by the row and column variable are the same themes, and thus no score is calculated for that theme matrix entry (block 440, FIG. 4). If x is not equal to y, then a score is calculated by multiplying the theme weight for the row theme (i.e., TW(x)) by the theme weight for the column theme (i.e., TW(y)) (block 445, FIG. 4). The score for that theme matrix entry is then incremented with this score product (block 450, FIG. 4).

This process is repeated for each row theme and each column theme. Specifically, if the current row theme is not the last theme (i.e., x is not equal to n−1), then the variable x is incremented, a new row theme is selected, and a product score is calculated for the new theme pair (blocks 455, 470, 435, 440, 445 and 450, FIG. 4). If the current row theme is the last theme in the row and the current column theme is not the last theme in the matrix column, then the variable "y" is incremented, the variable "x" is initialized to 0, and the new matrix entries are generated for the new column and each row theme. After processing of the last column theme for the last row has been completed, a new document is selected, and those themes contained in that document are processed in the same manner. This is represented in the flow diagram of FIG. 4 by the outer loop beginning with decision block 475. When all documents are processed, the theme matrix is complete.

Knowledge Base:

In general, the knowledge base 155 is the repository for all knowledge about languages and about the concrete and abstract worlds described by language in human discourse. The knowledge base 155 contains two major types of data: language specific data necessary to describe a language used for human discourse, and language independent data necessary to describe the meaning of human discourse.

The themes extracted from the documents undergo a normalization processing. In general, in nominalization processing, given a term, the goal is to analyze and manipulate its language dependent features until a language independent ontological representation is found. The knowledge base 155 consists of concepts, general categories, and cross-references. Concepts, or detailed categories, are a subset of the canonical forms determined by the language dependent data. These concepts themselves are language independent. In different languages their text representations may be different; however, these terms represent the universal ontological location. Concepts are typically thought of as identification numbers that have potentially different representations in different languages. These representations are the particular canonical forms in those languages. General categories are themselves concepts, and have canonical form representations in each language. These categories have the additional property that other concepts and general categories can be associated with them to create a knowledge hierarchy. Cross references are links between general categories. These links augment the ancestry links that are generated by the associations that form a directed graph.

The ontology in the knowledge base 155 contains only canonical nouns and noun phrases, and it is the normalization processing that provides mappings from non-nouns and non-canonical nouns. The organization of the knowledge base 155 provides a world-view of knowledge, and therefore the ontology actually contains only ideas of canonical nouns and noun phrases. The text representation of those ideas is different in each language, but the ontological location of the ideas in the knowledge base 155 remains the same for all languages.

The organizational part of the knowledge base 155 is the structured category hierarchy comprised at the top level of general categories. These categories represent knowledge about how the world is organized. The hierarchy of general categories is a standard tree structure. In one embodiment, a depth limit of sixteen levels is maintained. The tree organization provides a comprehensive structure that permits augmentation of more detailed information. The tree structure results in a broad but shallow structure. The average depth from tree top to a leaf node is five, and the average number of children for non-leaf nodes is 4.5. The following list of categories illustrate one embodiment of a knowledge base.

BRANCH 1: SCIENCE AND TECHNOLOGY

[1] communications
  [2] journalism
    [3] broadcast journalism
    [3] photojournalism
    [3] print journalism
      [4] newspapers
  [2] public speaking -continued

BRANCH 1: SCIENCE AND TECHNOLOGY

[2] publishing industry
  [3] desktop publishing
  [3] periodicals
    [4] business publications
  [3] printing
[2] telecommunications industry
  [3] computer networking
    [4] Internet technology
      [5] Internet providers
      [5] Web browsers
      [5] search engines
  [3] data transmission
  [3] fiber optics
  [3] telephone service
[1] formal education
  [2] colleges and universities
    [3] academic degrees
    [3] business education
  [2] curricula and methods
  [2] library science
  [2] reference books
  [2] schools
  [2] teachers and students
[1] hard sciences
  [2] aerospace industry
    [3] satellite technology
    [3] space exploration
      [4] Mars exploration
      [4] lunar exploration
      [4] space explorers
      [4] spacecraft and space stations
  [2] chemical industry
    [3] chemical adhesives
    [3] chemical dyes
    [3] chemical engineering
    [3] materials technology
      [4] industrial ceramics
      [4] metal industry
        [5] aluminum industry
        [5] metallurgy
        [5] steel industry
      [4] plastics
      [4] rubber
      [4] synthetic textiles
    [3] paints and finishing materials
    [3] pesticides
      [4] fungicides
      [4] herbicides
  [2] chemistry
    [3] chemical properties
    [3] chemical reactions
    [3] chemicals
      [4] chemical acids
      [4] chemical elements
      [4] molecular reactivity
      [4] molecular structure
    [3] chemistry tools
      [4] chemical analysis
      [4] chemistry glassware
      [4] purification and isolation of chemicals
    [3] organic chemistry
    [3] theory and physics of chemistry
  [2] civil engineering
    [3] building architecture
    [3] construction industry
      [4] building components
        [5] exterior structures
          [6] entryways and extensions
          [6] landscaping
          [6] ornamental architecture
          [6] roofs and towers
          [6] walls
          [6] windows
        [5] interior structures
          [6] building foundations
          [6] building systems
            [7] electrical systems -continued

BRANCH 1: SCIENCE AND TECHNOLOGY

[7] fireproofing and insulation
            [7] plumbing
          [6] rooms
      [4] buildings and dwellings
        [5] outbuildings
      [4] carpentry
      [4] construction equipment
      [4] construction materials
        [5] paneling and composites
        [5] surfaces and finishing
  [2] computer industry
    [3] computer hardware industry
      [4] computer components
        [5] computer memory
        [5] microprocessors
      [4] computer peripherals
        [5] data storage devices
      [4] hand-held computers
      [4] laptop computers
      [4] mainframes
      [4] personal computers
      [4] workstations
    [3] computer science
      [4] artificial intelligence
    [3] computer security and data encryption
      [4] computer viruses and protection
    [3] computer software industry
      [4] CAD-CAM
      [4] client-server software
      [4] computer programming
        [5] programming development tools
        [5] programming languages
      [4] operating systems
    [3] computer standards
    [3] cyberculture
    [3] human-computer interaction
    [3] information technology
      [4] computer multimedia
        [5] computer graphics
        [5] computer sound
        [5] computer video
      [4] databases
      [4] document management
      [4] natural language processing
      [4] spreadsheets
    [3] network computing
    [3] supercomputing and parallel computing
    [3] virtual reality
  [2] electrical engineering
  [2] electronics
    [3] consumer electronics
      [4] audio electronics
      [4] video electronics
    [3] electronic circuits and components
      [4] microelectronics
      [4] semiconductors and superconductors
    [3] radar technology
  [2] energy industry
    [3] electric power industry
    [3] energy sources
      [4] alternative energy sources
      [4] fossil fuels industry
        [5] coal industry
        [5] petroleum products industry
      [4] nuclear power industry
  [2] environment control industries
    [3] heating and cooling systems
    [3] pest control
    [3] waste management
  [2] explosives and firearms
    [3] chemical explosives
    [3] firearm parts and accessories
    [3] recreational firearms
  [2] geology
    [3] geologic formations
    [3] geologic substances
      [4] mineralogy -continued

BRANCH 1: SCIENCE AND TECHNOLOGY

[5] gemstones
    [5] igneous rocks
    [5] metamorphic rocks
    [5] sedimentary rocks
  [3] hydrology
  [3] meteorology
   [4] atmospheric science
   [4] clouds
   [4] storms
   [4] weather modification
   [4] weather phenomena
   [4] winds
  [3] mining industry
  [3] natural disasters
  [3] oceanography
  [3] seismology
  [3] speleology
  [3] vulcanology
[2] inventions
[2] life sciences
 [3] biology
  [4] biochemistry
   [5] biological compounds
    [6] amino acids
    [6] enzymes
    [6] hormones
     [7] androgens and anabolic steroids
     [7] blood sugar hormones
     [7] corticosteroids
     [7] estrogens and progestins
     [7] gonadotropins
     [7] pituitary hormones
     [7] thyroid hormones
    [6] lipids and fatty acids
    [6] nucleic acids
    [6] sugars and carbohydrates
    [6] toxins
    [6] vitamins
   [5] cell reproduction
   [5] cell structure and function
   [5] molecular genetics
  [4] botany
   [5] algae
   [5] fungi
   [5] plant diseases
   [5] plant kingdom
    [6] ferns
    [6] flowering plants
     [7] cacti
     [7] grasses
    [6] mosses
    [6] trees and shrubs
     [7] conifers
     [7] deciduous trees
     [7] palm trees
   [5] plant physiology
    [6] plant development
    [6] plant parts
  [4] lower life forms
   [5] bacteria
   [5] viruses
  [4] paleontology
   [5] dinosaurs
  [4] physiology
   [5] anatomy
    [6] cardiovascular systems
    [6] digestive systems
    [6] extremities and appendages
    [6] glandular systems
    [6] head and neck
     [7] ear anatomy
     [7] eye anatomy
     [7] mouth and teeth
    [6] immune systems
     [7] antigens and antibodies
    [6] lymphatic systems
    [6] muscular systems -continued

BRANCH 1: SCIENCE AND TECHNOLOGY

[6] nervous systems
    [6] reproductive systems
    [6] respiratory systems
    [6] skeletal systems
    [6] tissue systems
    [6] torso
    [6] urinary systems
   [5] reproduction and development
  [4] populations and vivisystems
   [5] biological evolution
   [5] ecology
    [6] ecological conservation
    [6] environmental pollution
   [5] genetics and heredity
  [4] zoology
   [5] invertebrates
    [6] aquatic sponges
    [6] arthropods
     [7] arachnids
      [8] mites and ticks
      [8] scorpions
      [8] spiders
     [7] crustaceans
     [7] insects
    [6] coral and sea anemones
    [6] jellyfish
    [6] mollusks
     [7] clams, oysters, and mussels
     [7] octopi and squids
     [7] snails and slugs
    [6] starfish and sea urchins
    [6] worms
   [5] vertebrates
    [6] amphibians
    [6] birds
     [7] birds of prey
      [8] owls
     [7] game birds
     [7] hummingbirds
     [7] jays, crows, and magpies
     [7] parrots and parakeets
     [7] penguins
     [7] pigeons and doves
     [7] warblers and sparrows
     [7] water birds
      [8] ducks, geese, and swans
      [8] gulls and terns
      [8] pelicans
     [7] woodpeckers
     [7] wrens
    [6] fish
     [7] boneless fish
      [8] rays and skates
      [8] sharks
     [7] bony fish
      [8] deep sea fish
      [8] eels
      [8] tropical fish
     [7] jawless fish
    [6] mammals
     [7] anteaters and sloths
      [8] aardvarks
     [7] carnivores
      [8] canines
      [8] felines
     [7] chiropterans
     [7] elephants
     [7] hoofed mammals
      [8] cattle
      [8] goats
      [8] horses
      [8] pigs
      [8] sheep
     [7] hyraxes
     [7] marine mammals
      [8] seals and walruses
       [9] manatees -continued

BRANCH 1: SCIENCE AND TECHNOLOGY

[8] whales and porpoises
   [7] marsupials
   [7] monotremes
   [7] primates
    [8] lemurs
   [7] rabbits
   [7] rodents
  [6] reptiles
   [7] crocodilians
   [7] lizards
   [7] snakes
   [7] turtles
[3] biotechnology
 [4] antibody technology
  [5] immunoassays
 [4] biometrics
  [5] voice recognition technology
 [4] genetic engineering
 [4] pharmaceutical industry
  [5] anesthetics
   [6] general anesthetics
   [6] local anesthetics
  [5] antagonists and antidotes
  [5] antibiotics, antimicrobials, and antiparasitics
   [6] anthelmintics
   [6] antibacterials
    [7] antimalarials
    [7] antituberculars and antileprotics
   [6] antifungals
   [6] antivirals
   [6] local anti-infectives
  [5] antigout agents
  [5] autonomic nervous system drugs
   [6] neuromuscular blockers
   [6] skeletal muscle relaxants
  [5] blood drugs
  [5] cardiovascular drugs
   [6] antihypertensives
  [5] central nervous system drugs
   [6] analgesics and antipyretics
   [6] antianxiety agents
   [6] antidepressants
   [6] antipsychotics
   [6] narcotic and opioid analgesics
   [6] nonsteroidal anti-inflammatory drugs
   [6] sedative-hypnotics
  [5] chemotherapeutics, antineoplastic agents
  [5] dermatomucosal agents
   [6] topical corticosteroids
  [5] digestive system drugs
   [6] antacids, adsorbents, and antiflatulents
   [6] antidiarrheals
   [6] antiemetics
   [6] antiulcer agents
   [6] digestants
   [6] laxatives
  [5] eye, ear, nose, and throat drugs
   [6] nasal agents
   [6] ophthalmics
    [7] ophthalmic vasoconstrictors
   [6] otics, ear care drugs
  [5] fluid and electrolyte balance drugs
   [6] diuretics
  [5] hormonal agents
  [5] immune system drugs
   [6] antitoxins and antivenins
   [6] biological response modifiers
   [6] immune serums
   [6] immunosuppressants
   [6] vaccines and toxoids
  [5] oxytocics
  [5] respiratory drugs
   [6] antihistamines
   [6] bronchodilators
   [6] expectorants and antitussives
  [5] spasmolytics
  [5] topical agents -continued

BRANCH 1: SCIENCE AND TECHNOLOGY

[3] health and medicine
  [4] healthcare industry
   [5] healthcare providers and practices
   [5] medical disciplines and specialties
    [6] cardiology
    [6] dentistry
    [6] dermatology
    [6] geriatrics
    [6] neurology
    [6] obstetrics and gynecology
    [6] oncology
    [6] ophthalmology
    [6] pediatrics
   [5] medical equipment
    [6] artificial limbs and organs
    [6] dressings and supports
   [5] medical equipment manufacturers
   [5] medical facilities
  [4] medical problems
   [5] blood disorders
   [5] cancers and tumors
    [6] carcinogens
   [5] cardiovascular disorders
   [5] developmental disorders
   [5] environment-related afflictions
   [5] gastrointestinal disorders
   [5] genetic and hereditary disorders
   [5] infectious diseases
    [6] communicable diseases
     [7] sexually transmitted diseases
   [5] injuries
   [5] medical disabilities
   [5] neurological disorders
   [5] respiratory disorders
   [5] skin conditions
  [4] nutrition
  [4] practice of medicine
   [5] alternative medicine
   [5] medical diagnosis
    [6] medical imaging
   [5] medical personnel
   [5] medical procedures
    [6] physical therapy
    [6] surgical procedures
     [7] cosmetic surgery
  [4] veterinary medicine
[2] machinery
 [3] machine components
[2] mathematics
 [3] algebra
  [4] linear algebra
  [4] modern algebra
 [3] arithmetic
  [4] elementary algebra
 [3] calculus
 [3] geometry
  [4] mathematical topology
  [4] plane geometry
  [4] trigonometry
 [3] math tools
 [3] mathematical analysis
 [3] mathematical foundations
  [4] number theory
  [4] set theory
  [4] symbolic logic
 [3] statistics
[2] mechanical engineering
[2] physics
 [3] acoustics
 [3] cosmology
  [4] astronomy
   [5] celestial bodies
    [6] celestial stars
    [6] comets
    [6] constellations
    [6] galaxies
    [6] moons -continued

| BRANCH 1: SCIENCE AND TECHNOLOGY |
|---|

[6] nebulae
      [6] planets
     [5] celestial phenomena
   [3] electricity and magnetism
   [3] motion physics
   [3] nuclear physics
    [4] subatomic particles
   [3] optical technology
    [4] holography
    [4] laser technology
     [5] high-energy lasers
     [5] low-energy lasers
   [3] thermodynamics
 [2] robotics
 [2] textiles
 [2] tools and hardware
   [3] cements and glues
   [3] hand and power tools
    [4] chisels
    [4] drills and bits
    [4] gauges and calipers
    [4] hammers
    [4] machine tools
    [4] planes and sanders
    [4] pliers and clamps
    [4] screwdrivers
    [4] shovels
    [4] trowels
    [4] wrenches
   [3] knots
[1] social sciences
 [2] anthropology
   [3] cultural identities
    [4] Native Americans
   [3] cultural studies
    [4] ancient cultures
   [3] customs and practices
 [2] archeology
   [3] ages and periods
   [3] prehistoric humanoids
 [2] history
   [3] U.S. history
    [4] slavery in the U.S.
   [3] ancient Rome
    [4] Roman emperors
   [3] ancient history
   [3] biographies
   [3] historical eras
 [2] human sexuality
   [3] homosexuality
   [3] pornography
   [3] prostitution
   [3] sexual issues
 [2] linguistics
   [3] descriptive linguistics
    [4] grammar
     [5] parts of speech
    [4] phonetics and phonology
   [3] historical linguistics
   [3] languages
   [3] linguistic theories
   [3] rhetoric and figures of speech
   [3] sociolinguistics
    [4] dialects and accents
   [3] writing and mechanics
    [4] punctuation and diacritics
    [4] writing systems
 [2] psychology
   [3] abnormal psychology
    [4] anxiety disorders
    [4] childhood onset disorders
    [4] cognitive disorders
    [4] dissociative disorders
    [4] eating disorders
    [4] impulse control disorders
    [4] mood disorders
    [4] personality disorders -continued

| BRANCH 1: SCIENCE AND TECHNOLOGY |
|---|

[4] phobias
    [4] psychosomatic disorders
    [4] psychotic disorders
    [4] somatoform disorders
    [4] substance related disorders
   [3] behaviorist psychology
   [3] cognitive psychology
   [3] developmental psychology
   [3] experimental psychology
   [3] humanistic psychology
   [3] neuropsychology
   [3] perceptual psychology
   [3] psychiatry
   [3] psychoanalytic psychology
   [3] psychological states and behaviors
   [3] psychological therapy
   [3] psychological tools and techniques
   [3] sleep psychology
    [4] sleep disorders
 [2] sociology
   [3] demographics
   [3] social identities
    [4] gender studies
    [4] senior citizens
   [3] social movements and institutions
   [3] social structures
[1] transportation
 [2] aviation
   [3] aircraft
   [3] airlines
   [3] airports
   [3] avionics
 [2] freight and shipping
   [3] package delivery industry
   [3] trucking industry
 [2] ground transportation
   [3] animal powered transportation
   [3] automotive industry
    [4] automobiles
    [4] automotive engineering
     [5] automotive parts
     [5] internal combustion engines
    [4] automotive sales
    [4] automotive service and repair
    [4] car rentals
    [4] motorcycles
    [4] trucks and buses
   [3] human powered vehicles
   [3] rail transportation
    [4] subways
    [4] trains
   [3] roadways and driving
 [2] marine transportation
   [3] boats and ships
   [3] seamanship
   [3] waterways
 [2] travel industry
   [3] hotels and lodging
   [3] tourism
    [4] cruise lines
    [4] places of interest
    [4] resorts and spas

| BRANCH 2: BUSINESS AND ECONOMICS |
|---|

[1] business services industry
   [1] commerce and trade
    [2] electronic commerce
    [2] general commerce
    [2] international trade and finance
    [2] mail-order industry
    [2] retail trade industry -continued

| BRANCH 2: BUSINESS AND ECONOMICS |
| --- |

[3] convenience stores
[3] department stores
[3] discount stores
[3] supermarkets
[2] wholesale trade industry
[1] corporate business
  [2] business enterprise
    [3] entrepreneurship
  [2] business fundamentals
  [2] consulting industry
  [2] corporate finance
    [3] accountancy
  [2] corporate management
  [2] corporate practices
  [2] diversified companies
  [2] human resources
    [3] employment agencies
  [2] office products
  [2] quality control
    [3] customer support
  [2] research and development
  [2] sales and marketing
    [3] advertising industry
[1] economics
[1] financial institutions
  [2] banking industry
  [2] insurance industry
  [2] real-estate industry
[1] financial investments
  [2] commodities market
    [3] money
      [4] currency market
    [3] precious metals market
  [2] general investment
  [2] personal finance
    [3] retirement investments
  [2] securities market
    [3] bond market
    [3] mutual funds
    [3] stock market
[1] financial lending
  [2] credit cards
[1] industrial business
  [2] industrial engineering
    [3] production methods
  [2] industrialists and financiers
  [2] manufacturing
    [3] industrial goods manufacturing
[1] public sector industry
[1] taxes and tariffs
[1] work force
  [2] organized labor

BRANCH 3

| GOVERNMENT AND MILITARY |
| --- |

[1] government
  [2] county government
  [2] forms and philosophies of government
  [2] government actions
  [2] government bodies and institutions
    [3] executive branch
      [4] U.S. presidents
      [4] executive cabinet
    [3] judiciary branch
      [4] Supreme Court
        [5] chief justices
    [3] legislative branch
      [4] house of representatives
      [4] senate
  [2] government officials
    [3] royalty and aristocracy
    [3] statesmanship BRANCH 3-continued

| GOVERNMENT AND MILITARY |
| --- |

[2] government programs
    [3] social programs
      [4] welfare
  [2] international relations
    [3] Cold War
    [3] diplomacy
    [3] immigration
  [2] law
    [3] business law
    [3] courts
    [3] crimes and offenses
      [4] controlled substances
        [5] substance abuse
      [4] criminals
      [4] organized crime
    [3] law enforcement
    [3] law firms
    [3] law systems
      [4] constitutional law
    [3] legal bodies
    [3] legal customs and formalities
    [3] legal judgments
    [3] legal proceedings
    [3] prisons and punishments
  [2] municipal government
    [3] municipal infrastructure
    [3] urban areas
      [4] urban phenomena
      [4] urban structures
  [2] politics
    [3] civil rights
    [3] elections and campaigns
    [3] political activities
    [3] political advocacy
      [4] animal rights
      [4] consumer advocacy
    [3] political parties
    [3] political principles and philosophies
      [4] utopias
    [3] political scandals
    [3] revolution and subversion
      [4] terrorism
  [2] postal communications
  [2] public facilities
  [2] state government
[1] military
  [2] air force
  [2] armored clothing
  [2] army
  [2] cryptography
  [2] military honors
  [2] military intelligence
  [2] military leaders
  [2] military ranks
    [3] army, air force, and marine ranks
    [3] navy and coast guard ranks
  [2] military wars
    [3] American Civil War
    [3] American Revolution
    [3] World War I
    [3] World War II
    [3] warfare
  [2] military weaponry
    [3] bombs and mines
    [3] chemical and biological warfare
    [3] military aircraft
    [3] missiles, rockets, and torpedoes
    [3] nuclear weaponry
    [3] space-based weapons
  [2] navy
    [3] warships
  [2] service academies

BRANCH 4

SOCIAL ENVIRONMENT

[1] belief systems
  [2] folklore
  [2] mythology
    [3] Celtic mythology
    [3] Egyptian mythology
    [3] Greek mythology
    [3] Japanese mythology
    [3] Mesopotamian and Sumerian mythology
    [3] Norse and Germanic mythology
    [3] Roman mythology
    [3] South and Central American mythology
    [3] mythological beings
    [3] myths and legends
  [2] paranormal phenomena
    [3] astrology
    [3] occult
    [3] superstitions
  [2] philosophy
    [3] epistemology
    [3] ethics and aesthetics
    [3] metaphysics
    [3] philosophical logic
    [3] schools of philosophy
  [2] religion
    [3] God and divinity
    [3] doctrines and practices
    [3] history of religion
    [3] religious institutions and structures
    [3] sacred texts and objects
      [4] Bible
      [4] liturgical garments
    [3] world religions
      [4] Christianity
        [5] Christian denominations
        [5] Christian heresies
        [5] Christian theology
        [5] Mormonism
        [5] Roman Catholicism
          [6] popes
          [6] religious orders
        [5] evangelism
        [5] protestant reformation
      [4] Islam
      [4] Judaism
      [4] eastern religions
        [5] Buddhism
        [5] Hinduism
          [6] Hindu deities
[1] clothing and appearance
  [2] clothing
    [3] clothing accessories
      [4] belts
      [4] functional accessories
      [4] gloves
    [3] fabrics
      [4] laces
      [4] leather and fur
    [3] footwear
    [3] garment parts
      [4] garment fasteners
      [4] garment trim
    [3] headgear
      [4] hats
      [4] helmets
    [3] laundry
    [3] neckwear
    [3] outer garments
      [4] dresses
      [4] formalwear
      [4] jackets
      [4] pants
      [4] shirts
      [4] skirts
      [4] sporting wear
      [4] sweaters
    [3] sewing
    [3] undergarments

BRANCH 4-continued

SOCIAL ENVIRONMENT

[4] deshabille
      [4] hosiery
      [4] lingerie
      [4] men's underwear
  [2] cosmetics
    [3] facial hair
    [3] hair styling
  [2] fashion industry
    [3] supermodels
  [2] grooming
    [3] grooming aids
  [2] jewelry
[1] emergency services
  [2] emergency dispatch
  [2] emergency medical services
  [2] fire prevention and suppression
  [2] hazardous material control
  [2] heavy rescue
[1] family
  [2] death and burial
    [3] funeral industry
  [2] divorce
  [2] infancy
  [2] kinship and ancestry
  [2] marriage
  [2] pregnancy
    [3] contraception
  [2] upbringing
[1] food and agriculture
  [2] agribusiness
  [2] agricultural equipment
  [2] agricultural technology
    [3] soil management
      [4] fertilizers
  [2] aquaculture
  [2] cereals
  [2] condiments
  [2] crop grain
  [2] dairy products
    [3] cheeses
  [2] drinking and dining
    [3] alcoholic beverages
      [4] beers
      [4] liqueurs
      [4] liquors
      [4] mixed drinks
      [4] wines
        [5] wineries
    [3] cooking
    [3] meals and dishes
      [4] sandwiches
    [3] non-alcoholic beverages
      [4] coffee
      [4] soft drinks
      [4] tea
  [2] farming
  [2] fats and oils
    [3] butter and margarine
  [2] food and drink industry
    [3] foodservice industry
    [3] meat packing industry
  [2] forestry
    [3] forest products
  [2] fruits and vegetables
    [3] legumes
  [2] leavening agents
  [2] mariculture
  [2] meats
    [3] beef
    [3] pate and sausages
    [3] pork
    [3] poultry
  [2] nuts and seeds
  [2] pasta
  [2] prepared foods
    [3] breads
    [3] candies

BRANCH 4-continued
SOCIAL ENVIRONMENT

- [3] crackers
- [3] desserts
    - [4] cakes
    - [4] cookies
    - [4] pies
- [3] pastries
- [3] sauces
- [3] soups and stews
- [2] ranching
- [2] seafood
- [2] spices and flavorings
    - [3] sweeteners
- [1] housekeeping and butlery
- [1] housewares
    - [2] beds
    - [2] candles
    - [2] carpets and rugs
    - [2] cases, cabinets, and chests
    - [2] chairs and sofas
    - [2] curtains, drapes, and screens
    - [2] functional wares
        - [3] cleaning supplies
    - [2] home appliances
    - [2] kitchenware
        - [3] cookers
        - [3] fine china
        - [3] glassware
        - [3] kitchen appliances
        - [3] kitchen utensils
            - [4] cutting utensils
        - [31] pots and pans
        - [3] serving containers
        - [3] tableware
    - [2] lamps
    - [2] linen
    - [2] mirrors
    - [2] ornamental objects
    - [2] stationery
    - [2] stools and stands
    - [2] tables and desks
    - [2] timepieces
- [1] leisure and recreation
    - [2] arts and entertainment
        - [3] broadcast media
            - [4] radio
                - [5] amateur radio
            - [4] television
        - [3] cartoons, comic books, and superheroes
        - [3] cinema
            - [4] movie stars
            - [4] movie tools and techniques
            - [4] movies
        - [3] entertainments and spectacles
            - [4] entertainers
        - [3] humor and satire
        - [3] literature
            - [4] children's literature
            - [4] literary criticism
            - [4] literary devices and techniques
            - [4] poetry
                - [5] classical poetry
            - [4] prose
                - [5] fiction
                    - [6] horror fiction
                    - [6] mystery fiction
            - [4] styles and schools of literature
        - [3] performing arts
            - [4] dance
                - [5] ballet
                - [5] choreography
                - [5] folk dances
                - [5] modern dance
            - [4] drama
                - [5] dramatic structure
                - [5] stagecraft
            - [4] music
                - [5] blues music
                - [5] classical music
                - [5] composition types
                - [5] folk music
                - [5] jazz music
                - [5] music industry
                - [5] musical instruments
                    - [6] keyboard instruments
                    - [6] percussion instruments
                    - [6] string instruments
                    - [6] wind instruments
                        - [7] brass instruments
                        - [7] woodwinds
                - [5] opera and vocal
                - [5] popular music and dance
                - [5] world music
        - [3] science fiction
        - [3] visual arts
            - [4] art galleries and museums
            - [4] artistic painting
                - [5] painting tools and techniques
                - [5] styles and schools of art
            - [4] graphic arts
            - [4] photography
                - [5] cameras
                - [5] photographic lenses
                - [5] photographic processes
                - [5] photographic techniques
                - [5] photographic tools
            - [4] sculpture
                - [5] sculpture tools and techniques
    - [2] crafts
    - [2] games
        - [3] indoor games
            - [4] board games
            - [4] card games
            - [4] video games
        - [3] outdoor games
    - [2] gaming industry
        - [3] gambling
    - [2] gardening
    - [2] hobbies
        - [3] coin collecting
        - [3] stamp collecting
    - [2] outdoor recreation
        - [3] hunting and fishing
    - [2] pets
    - [2] restaurant industry
    - [2] sports
        - [3] Olympics
        - [3] aquatic sports
            - [4] canoeing, kayaking, and rafting
            - [4] swimming and diving
            - [4] yachting
        - [3] baseball
        - [3] basketball
        - [3] bicycling
        - [3] bowling
        - [3] boxing
        - [3] equestrian events
            - [4] horse racing
            - [4] rodeo
        - [3] fantasy sports
        - [3] fitness and health
            - [4] fitness equipment
        - [3] football
        - [3] golf
        - [3] gymnastics
        - [3] martial arts
        - [3] motor sports
            - [4] Formula I racing
            - [4] Indy car racing
            - [4] NASCAR racing
            - [4] drag racing
            - [4] motorcycle racing
            - [4] off-road racing
        - [3] soccer
        - [3] sports equipment

BRANCH 4-continued
SOCIAL ENVIRONMENT

[3] tennis  
    [3] track and field  
    [3] winter sports  
        [4] hockey  
        [4] ice skating  
        [4] skiing  
[2] tobacco industry  
[2] toys

BRANCH 5
GEOGRAPHY

[1] cartography  
    [2] explorers  
[1] physical geography  
    [2] bodies of water  
        [3] lakes  
        [3] oceans  
        [3] rivers  
    [2] land forms  
        [3] coastlands  
        [3] continents  
        [3] deserts  
        [3] highlands  
        [3] islands  
        [3] lowlands  
        [3] mountains  
        [3] wetlands  
[1] political geography  
    [2] Africa  
        [3] Central Africa  
            [4] Angola  
            [4] Burundi  
            [4] Central African Republic  
            [4] Congo  
            [4] Gabon  
            [4] Kenya  
            [4] Malawi  
            [4] Rwanda  
            [4] Tanzania  
            [4] Uganda  
            [4] Zaire  
            [4] Zambia  
        [3] North Africa  
            [4] Algeria  
            [4] Chad  
            [4] Djibouti  
            [4] Egypt  
            [4] Ethiopia  
            [4] Libya  
            [4] Morocco  
            [4] Somalia  
            [4] Sudan  
            [4] Tunisia  
        [3] Southern Africa  
            [4] Botswana  
            [4] Lesotho  
            [4] Mozambique  
            [4] Namibia  
            [4] South Africa  
            [4] Swaziland  
            [4] Zimbabwe  
        [3] West Africa  
            [4] Benin  
            [4] Burkina Faso  
            [4] Cameroon  
            [4] Equatorial Guinea  
            [4] Gambia  
            [4] Ghana  
            [4] Guinea  
            [4] Guinea-Bissau  
            [4] Ivory Coast  
            [4] Liberia

BRANCH 5-continued
GEOGRAPHY

[4] Mali  
            [4] Mauritania  
            [4] Niger  
            [4] Nigeria  
            [4] Sao Tome and Principe  
            [4] Senegal  
            [4] Sierra Leone  
            [4] Togo  
    [2] Antarctica  
    [2] Arctic  
        [3] Greenland  
        [3] Iceland  
    [2] Asia  
        [3] Central Asia  
            [4] Afghanistan  
            [4] Bangladesh  
            [4] Bhutan  
            [4] India  
            [4] Kazakhstan  
            [4] Kyrgyzstan  
            [4] Nepal  
            [4] Pakistan  
            [4] Tajikstan  
            [4] Turkmenistan  
            [4] Uzbekistan  
        [3] East Asia  
            [4] China  
            [4] Hong Kong  
            [4] Japan  
            [4] Macao  
            [4] Mongolia  
            [4] North Korea  
            [4] South Korea  
            [4] Taiwan  
        [3] Southeast Asia  
            [4] Brunei  
            [4] Cambodia  
            [4] Indonesia  
            [4] Laos  
            [4] Malaysia  
            [4] Myanmar  
            [4] Papua New Guinea  
            [4] Philippines  
            [4] Singapore  
            [4] Thailand  
            [4] Vietnam  
    [2] Atlantic area  
        [3] Azores  
        [3] Bermuda  
        [3] Canary Islands  
        [3] Cape Verde  
        [3] Falkland Islands  
    [2] Caribbean  
        [3] Antigua and Barbuda  
        [3] Bahamas  
        [3] Barbados  
        [3] Cuba  
        [3] Dominica  
        [3] Dominican Republic  
        [3] Grenada  
        [3] Haiti  
        [3] Jamaica  
        [3] Netherlands Antilles  
        [3] Puerto Rico  
        [3] Trinidad and Tobago  
    [2] Central America  
        [3] Belize  
        [3] Costa Rica  
        [3] El Salvador  
        [3] Guatemala  
        [3] Honduras  
        [3] Nicaragua  
        [3] Panama  
    [2] Europe  
        [3] Eastern Europe  
            [4] Albania  
            [4] Armenia

BRANCH 5-continued

GEOGRAPHY

[4] Azerbaijan
[4] Belarus
[4] Bulgaria
[4] Czech Republic
[4] Czechoslovakia
[4] Estonia
[4] Greece
[4] Hungary
[4] Latvia
[4] Lithuania
[4] Moldava
[4] Poland
[4] Republic of Georgia
[4] Romania
[4] Russia
    [5] Siberia
[4] Slovakia
[4] Soviet Union
[4] Ukraine
[4] Yugoslavia
    [5] Bosnia and Herzegovina
    [5] Croatia
    [5] Macedonia
    [5] Montenegro
    [5] Serbia
    [5] Slovenia
[3] Western Europe
  [4] Austria
  [4] Belgium
  [4] Denmark
  [4] Faeroe Island
  [4] Finland
  [4] France
  [4] Germany
  [4] Iberia
    [5] Andorra
    [5] Portugal
    [5] Spain
  [4] Ireland
  [4] Italy
  [4] Liechtenstein
  [4] Luxembourg
  [4] Monaco
  [4] Netherlands
  [4] Norway
  [4] San Marino
  [4] Sweden
  [4] Switzerland
  [4] United Kingdom
    [5] England
    [5] Northern Ireland
    [5] Scotland
    [5] Wales
[2] Indian Ocean area
  [3] Comoros
  [3] Madagascar
  [3] Maldives
  [3] Mauritius
  [3] Seychelles
  [3] Sri Lanka
[2] Mediterranean
  [3] Corsica
  [3] Cyprus
  [3] Malta
  [3] Sardinia
[2] Middle East
  [3] Bahrain
  [3] Iran
  [3] Iraq
  [3] Israel
  [3] Jordan
  [3] Kuwait
  [3] Lebanon
  [3] Oman
  [3] Palestine
  [3] Qatar
  [3] Saudi Arabia

BRANCH 5-continued

GEOGRAPHY

[3] Socotra
  [3] Syria
  [3] Turkey
  [3] United Arab Emirates
  [3] Yemen
[2] North America
  [3] Canada
  [3] Mexico
  [3] United States
    [4] Alabama
    [4] Alaska
    [4] Arizona
    [4] Arkansas
    [4] California
    [4] Colorado
    [4] Delaware
    [4] Florida
    [4] Georgia
    [4] Hawaii
    [4] Idaho
    [4] Illinois
    [4] Indiana
    [4] Iowa
    [4] Kansas
    [4] Kentucky
    [4] Louisiana
    [4] Maryland
    [4] Michigan
    [4] Minnesota
    [4] Mississippi
    [4] Missouri
    [4] Montana
    [4] Nebraska
    [4] Nevada
    [4] New England
      [5] Connecticut
      [5] Maine
      [5] Massachusetts
      [5] New Hampshire
      [5] Rhode Island
      [5] Vermont
    [4] New Jersey
    [4] New Mexico
    [4] New York
    [4] North Carolina
    [4] North Dakota
    [4] Ohio
    [4] Oklahoma
    [4] Oregon
    [4] Pennsylvania
    [4] South Carolina
    [4] South Dakota
    [4] Tennessee
    [4] Texas
    [4] Utah
    [4] Virginia
    [4] Washington
    [4] Washington D.C.
    [4] West Virginia
    [4] Wisconsin
    [4] Wyoming
[2] Pacific area
  [3] American Samoa
  [3] Australia
    [4] Tasmania
  [3] Cook Islands
  [3] Fiji
  [3] French Polynesia
  [3] Guam
  [3] Kiribati
  [3] Mariana Islands
  [3] Marshall Islands
  [3] Micronesia
  [3] Nauru
  [3] New Caledonia
  [3] New Zealand
  [3] Palau

BRANCH 5-continued

GEOGRAPHY

[3] Solomon Islands
   [3] Tonga
   [3] Tuvalu
   [3] Vanuatu
   [3] Western Samoa
 [2] South America
   [3] Argentina
   [3] Bolivia
   [3] Brazil
   [3] Chile
   [3] Colombia
   [3] Ecuador
   [3] French Guiana
   [3] Guyana
   [3] Paraguay
   [3] Peru
   [3] Suriname
   [3] Uruguay
   [3] Venezuela

BRANCH 6

ABSTRACT IDEAS AND CONCEPTS

[1] dynamic relations
 [2] activity
  [3] attempts
   [4] achievement
   [4] difficulty
   [4] ease
   [4] extemporaneousness
   [4] failure
   [4] preparation
   [4] success
  [3] inertia
  [3] motion
   [4] agitation
   [4] directional movement
    [5] ascent
    [5] convergence
    [5] departure
    [5] descent
    [5] divergence
    [5] entrance
    [5] inward motion
    [5] jumps
    [5] motions around
    [5] outward motion
    [5] progression
    [5] withdrawal
   [4] forceful motions
    [5] friction
    [5] pulls
    [5] pushes
    [5] throws
   [4] haste
   [4] slowness
   [4] transporting
  [3] rest
  [3] violence
 [2] change
  [3] exchanges
  [3] gradual change
  [3] major change
  [3] reversion
 [2] time
  [3] future
  [3] longevity
  [3] past
  [3] regularity of time
  [3] relative age
   [4] stages of development
  [3] simultaneity
  [3] time measurement

BRANCH 6-continued

ABSTRACT IDEAS AND CONCEPTS

[4] instants
  [3] timeliness
   [4] earliness
   [4] lateness
  [3] transience
[1] human life and activity
 [2] communication
  [3] announcements
  [3] conversation
  [3] declarations
  [3] disclosure
  [3] identifiers
  [3] implication
  [3] obscene language
  [3] representation
   [4] interpretation
  [3] secrecy
  [3] shyness
  [3] speech
  [3] styles of expression
   [4] boasting
   [4] clarity
   [4] eloquence
   [4] intelligibility
   [4] nonsense
   [4] plain speech
   [4] wordiness
 [2] feelings and sensations
  [3] calmness
  [3] composure
  [3] emotions
   [4] anger
   [4] contentment
   [4] courage
   [4] cowardice
   [4] happiness
   [4] humiliation
   [4] ill humor
   [4] insolence
   [4] nervousness
   [4] pickiness
   [4] regret
   [4] relief
   [4] sadness
   [4] vanity
  [3] excitement
  [3] five senses
   [4] audiences
   [4] hearing
    [5] faintness of sound
    [5] loudness
    [5] silence
    [5] sound
     [6] cries
     [6] dissonant sound
     [6] harmonious sound
     [6] harsh sound
     [6] repeated sounds
   [4] sight
    [5] appearance
    [5] fading
    [5] visibility
   [4] smelling
    [5] odors
   [4] tasting
    [5] flavor
     [6] sweetness
   [4] touching
  [3] numbness
  [3] pleasure
  [3] suffering
 [2] gender
 [2] intellect
  [3] cleverness
  [3] foolishness
  [3] ignorance
  [3] intelligence and wisdom

BRANCH 6-continued

ABSTRACT IDEAS AND CONCEPTS

```
            [3] intuition
            [3] knowledge
            [3] learning
            [3] teaching
            [3] thinking
                [4] conclusion
                    [5] discovery
                    [5] evidence
                    [5] rebuttal
                [4] consideration
                    [5] analysis
                    [5] questioning
                    [5] tests
                [4] faith
                    [5] ideology
                    [5] sanctimony
                [4] judgment
                [4] rationality
                [4] skepticism
                [4] sophistry
                [4] speculation
    [2] social attitude, custom
        [3] behavior
            [4] approval
            [4] courtesy
            [4] criticism
            [4] cruelty
            [4] flattery
            [4] forgiveness
            [4] friendliness
            [4] generosity
            [4] gratitude
            [4] hatred
            [4] jealousy
            [4] kindness
            [4] love
                [5] adoration
            [4] respect
            [4] rudeness
            [4] ruthlessness
            [4] stinginess
            [4] sympathy
        [3] morality and ethics
            [4] evil
            [4] goodness
            [4] moral action
                [5] asceticism
                [5] decency
                [5] deception
                [5] integrity
                [5] lewdness
                [5] self-indulgence
            [4] moral consequences
                [5] allegation
                [5] entitlement
                [5] excuses
                [5] punishment
                [5] reparation
            [4] moral states
                [5] fairness
                [5] guilt
                [5] innocence
                [5] partiality
            [4] responsibility
        [3] reputation
            [4] acclaim
            [4] notoriety
        [3] social activities
            [4] enjoyment
            [4] monotony
        [3] social conventions
            [4] conventionalism
            [4] formality
            [4] trends
        [3] social transactions
            [4] debt
            [4] offers
```

BRANCH 6-continued

ABSTRACT IDEAS AND CONCEPTS

```
            [4] payments
            [4] petitions
            [4] promises and contracts
    [2] states of mind
        [3] anticipation
            [4] fear
            [4] frustration
            [4] hopefulness
            [4] hopelessness
            [4] prediction
            [4] surprise
            [4] warnings
        [3] boredom
        [3] broad-mindedness
        [3] carelessness
        [3] caution
        [3] confusion
        [3] creativity
        [3] curiosity
        [3] forgetfulness
        [3] patience
        [3] prejudice
        [3] remembering
        [3] seriousness
    [2] volition
        [3] assent
        [3] choices
            [4] denial
        [3] decidedness
        [3] dissent
        [3] eagerness
        [3] enticement
        [3] evasion
            [4] abandonment
            [4] escape
        [3] impulses
        [3] indecision
        [3] indifference
        [3] inevitability
        [3] motivation
        [3] obstinacy
        [3] tendency
[1] potential relations
    [2] ability, power
        [3] competence, expertise
        [3] energy, vigor
        [3] ineptness
        [3] productivity
        [3] provision
        [3] strength
        [3] weakness
    [2] conflict
        [3] attacks
        [3] competition
        [3] crises
        [3] retaliation
    [2] control
        [3] anarchy
        [3] command
            [4] cancelations
            [4] delegation
            [4] permission
            [4] prohibiting
        [3] defiance
        [3] influence
        [3] leadership
        [3] modes of authority
            [4] confinement
            [4] constraint
            [4] discipline
            [4] freedom
            [4] leniency
            [4] liberation
        [3] obedience
        [3] regulation
        [3] servility
    [2] possession
```

BRANCH 6-continued

ABSTRACT IDEAS AND CONCEPTS

- [3] giving
- [3] keeping
- [3] losing
- [3] receiving
- [3] sharing
- [3] taking
- [2] possibility
  - [3] chance
  - [3] falseness
  - [3] truth
- [2] purpose
  - [3] abuse
  - [3] depletion
  - [3] obsolescence
- [2] support
  - [3] cooperation
  - [3] mediation
  - [3] neutrality
  - [3] peace
  - [3] protection
  - [3] sanctuary
  - [3] security
- [1] relation
  - [2] agreement
  - [2] cause and effect
    - [3] causation
    - [3] result
  - [2] difference
  - [2] examples
  - [2] relevance
  - [2] similarity
    - [3] duplication
  - [2] uniformity
  - [2] variety
- [1] static relations
  - [2] amounts
    - [3] fewness
    - [3] fragmentation
    - [3] large quantities
    - [3] majority
    - [3] mass quantity
    - [3] minority
    - [3] numbers
    - [3] quantity modification
      - [4] combination
      - [4] connection
      - [4] decrease
      - [4] increase
      - [4] remainders
      - [4] separation
    - [3] required quantity
      - [4] deficiency
      - [4] excess
      - [4] sufficiency
    - [3] wholeness
      - [4] omission
      - [4] thoroughness
  - [2] existence
    - [3] creation
    - [3] life
  - [2] form
    - [3] defects
    - [3] effervescence
    - [3] physical qualities
      - [4] brightness and color
        - [5] color
          - [6] variegation
        - [5] colorlessness
        - [5] darkness
        - [5] lighting
          - [6] opaqueness
          - [6] transparency
      - [4] dryness
      - [4] fragility
      - [4] heaviness
      - [4] mass and weight measurement
      - [4] moisture

BRANCH 6-continued

ABSTRACT IDEAS AND CONCEPTS

- [4] pliancy
- [4] rigidity
- [4] softness
- [4] temperature
  - [5] coldness
  - [5] heat
- [4] texture
  - [5] fluids
  - [5] gaseousness
  - [5] jaggedness
  - [5] powderiness
  - [5] semiliquidity
  - [5] smoothness
- [4] weightlessness
- [3] shape
  - [4] angularity
  - [4] circularity
  - [4] curvature
  - [4] roundness
  - [4] straightness
- [3] symmetry
- [3] tangibility
- [3] topological form
  - [4] concavity
  - [4] convexity
  - [4] covering
  - [4] folds
  - [4] openings
- [2] nonexistence
  - [3] death
  - [3] destruction
- [2] quality
  - [3] badness
  - [3] beauty
  - [3] cleanness
  - [3] complexity
  - [3] correctness
  - [3] deterioration
  - [3] dirtiness
  - [3] good quality
  - [3] improvement
  - [3] mediocrity
  - [3] mistakes
  - [3] normality
  - [3] perfection
  - [3] remedy
  - [3] simplicity
  - [3] stability
    - [4] resistance to change
  - [3] strangeness
  - [3] ugliness
  - [3] value
- [2] range
  - [3] areas
    - [4] area measurement
    - [4] regions
    - [4] storage
    - [4] volume measurement
  - [3] arrangement
    - [4] locations
      - [5] anteriors
      - [5] compass directions
      - [5] exteriors
      - [5] interiors
      - [5] left side
      - [5] posteriors
      - [5] right side
      - [5] topsides
      - [5] undersides
    - [4] positions
      - [5] disorder
      - [5] groups
        - [6] dispersion
        - [6] exclusion
        - [6] inclusion
        - [6] itemization
        - [6] seclusion BRANCH 6-continued

ABSTRACT IDEAS AND CONCEPTS

[6] togetherness
    [5] hierarchical relationships
      [6] downgrades
      [6] ranks
      [6] upgrades
    [5] sequence
      [6] beginnings
      [6] continuation
      [6] ends
      [6] middles
      [6] preludes
[3] boundaries
[3] dimension
    [4] contraction
    [4] depth
    [4] expansion
    [4] flatness
    [4] height
    [4] largeness
    [4] length
    [4] linear measurement
    [4] narrowness
    [4] shallowness
    [4] shortness
    [4] slopes
    [4] smallness
    [4] steepness
    [4] thickness
[3] essence
[3] generalization
[3] nearness
[3] obstruction
[3] remoteness
[3] removal
[3] significance
[3] trivialness
[3] uniqueness
[3] ways and methods There are two types of general categories: concrete and abstract. This distinction is an organizational one only and it has no functional ramifications. A concrete category is one that represents a real-world industry, field of study, place, technology or physical entity. The following are examples of concrete categories: "chemistry", "computer industry", "social identities", "Alabama", and "Cinema." An abstract category is one that represents a relationship, quality, fielding or measure that does not have an obvious physical real-world manifestation. The following examples are abstract categories: "downward motion", "stability", "stupidity, foolishness, fools", "mediation, pacification", "texture", and "shortness."

Many language dependent canonical forms mapped to the language independent concepts stored as the knowledge base 155. The concept is any idea found in the real world that can be classified or categorized as being closely associated with one and only one knowledge base 155 general category. Similarly, any canonical form in a particular language maps to one and only one concept. For example, there is a universal concept for the birds called "cranes" in English, and a universal concept for the machines called "cranes" in English. However, the canonical form "cranes" does not map to either concept in English due to its ambiguity. In another language, which may have two different canonical forms for these concepts, mapping may not be a problem. Similarly, if "cranes" is an unambiguous canonical form in another language, then no ambiguity is presented in mapping.

The cross-references are mappings between general categories that are not directly ancestrally related, but that are close to each other ontologically. Direct ancestral relationship means parent-child, grandparent-grandchild, great grandparent-great grandchild, etc. The cross-references reflect a real-world relationship or common association between the two general categories involved. These relationships can usually be expressed by universal or majority quantification over one category. Examples of valid cross-references and the relationships are shown in Table 1.

TABLE 1

| oceans | --> fish (all oceans have fish) |
|---|---|
| belief systems | --> moral states (all belief systems address moral states) |
| electronics | --> physics (all electronics deals with physics) |
| death and burial | --> medical problems (most cases of death and burial are caused by medical problems) |

The cross-references are not automatically bi-directional. For example, in the first entry of Table 1, although oceans are associated with fish, because all oceans have fish, the converse may not be true since not all fish live in oceans. The names for the general categories are chosen such that the cross-references that involve those general categories are valid with the name or label choices. For example, if there is a word for fresh water fish in one language that is different than the word for saltwater fish, the oceans to fish cross-reference is not valid if the wrong translation of fish is used. Although the knowledge base 155 is described as cross-referencing general categories, concepts may also be linked without deviating from the spirit and scope of the invention.

Figure 5:
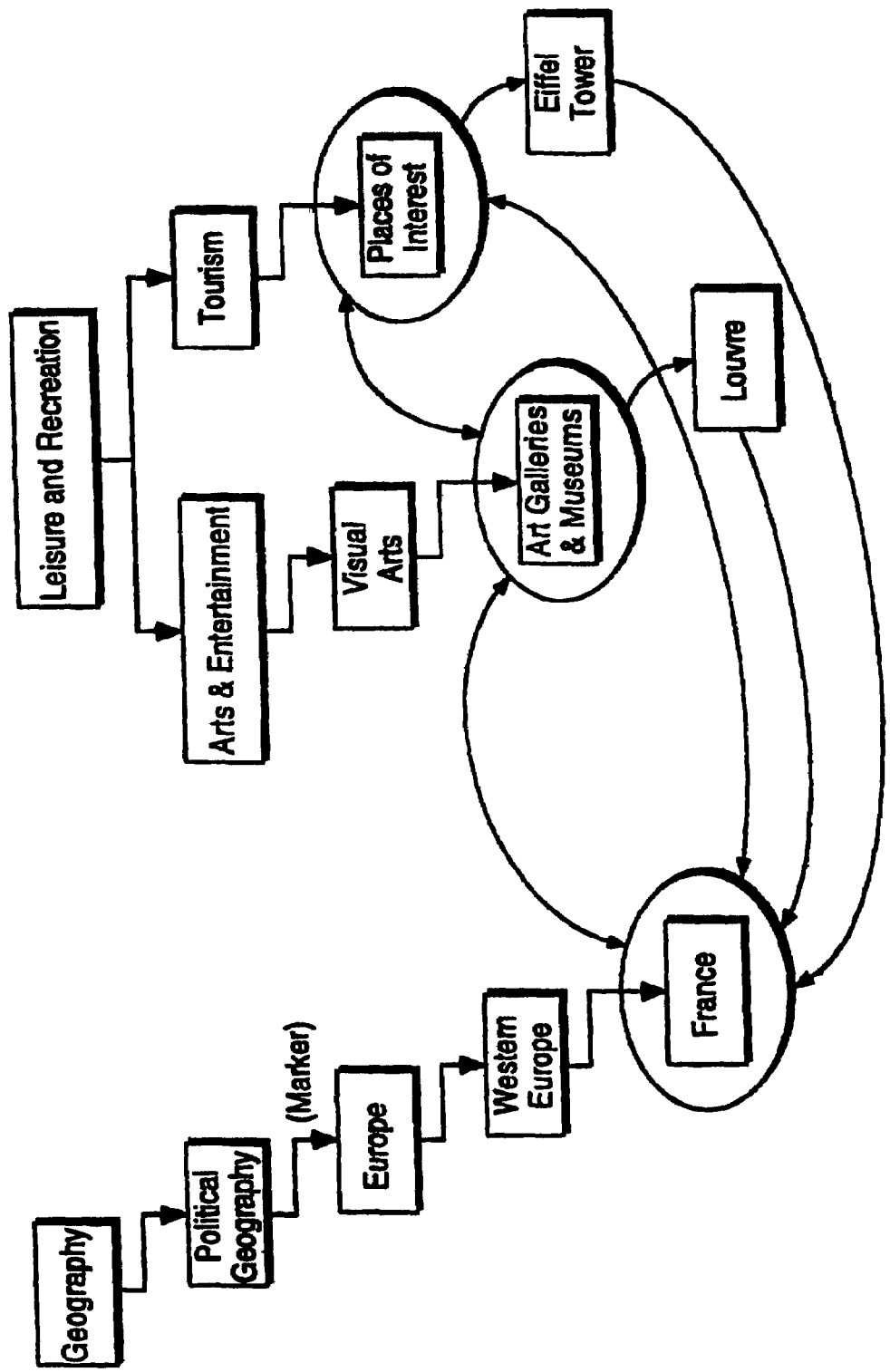
FIG. 5 illustrates an example portion of a knowledge base that includes cross references and links among categories and terms.

FIG. 5 illustrates an example portion of a knowledge base that includes cross-references and links among categories and terms. The classification hierarchy and notations shown in FIG. 5 illustrate an example that classifies a document on travel or tourism, and more specifically on traveling to France and visiting museums and places of interest. As shown in FIG. 5, the categories (e.g., terminology nodes) contains two independent static ontologies; one ontology for "geography", and a second ontology for "leisure and recreation." The "geography" ontology includes categories for "political geography", "Europe", "Western Europe", and "France." The categories "arts and entertainment" and "tourism" are arranged under the high level category "leisure and recreation." The "visual arts" and the "art galleries and museums" are subcategories under the "arts and entertainment" category, and the category "places of interest" is a subcategory under the category "tourism."

The knowledge base 155 is augmented to include linking and cross referencing among categories for which a linguistic, semantic, or usage association has been identified. For the example illustrated in FIG. 5, the categories "France", "art galleries and museums", and "places of interest" are cross referenced and/or linked as indicated by the circles, which encompass the category names, as well as the lines and arrows. This linking and/or cross referencing indicates that the categories "art galleries and museums" and "places of interest" may appear in the context of "France."

For this example, the knowledge base 155 indicates that the Louvre, a proper noun, is classified under the category "art galleries and museums", and further associates the term "Louvre" to the category "France." Similarly, the knowledge base 155 indicates that the term "Eiffel Tower" is classified under the category "places of interest", and is also associated with the category "France."

The knowledge base 155 may be characterized, in part, as a directed graph. The directed graph provides information about the linguistic, semantic, or usage relationships among categories, concepts and terminology. The "links" or "cross references" on the directed graph, which indicate the associations, is graphically depicted in FIG. 5 using lines and arrows. For the example shown in FIG. 5, the directed graph indicates that there is a linguistic, semantic, or usage association among the concepts "France", "art galleries and museums", and "places of interest."

Figure 6:
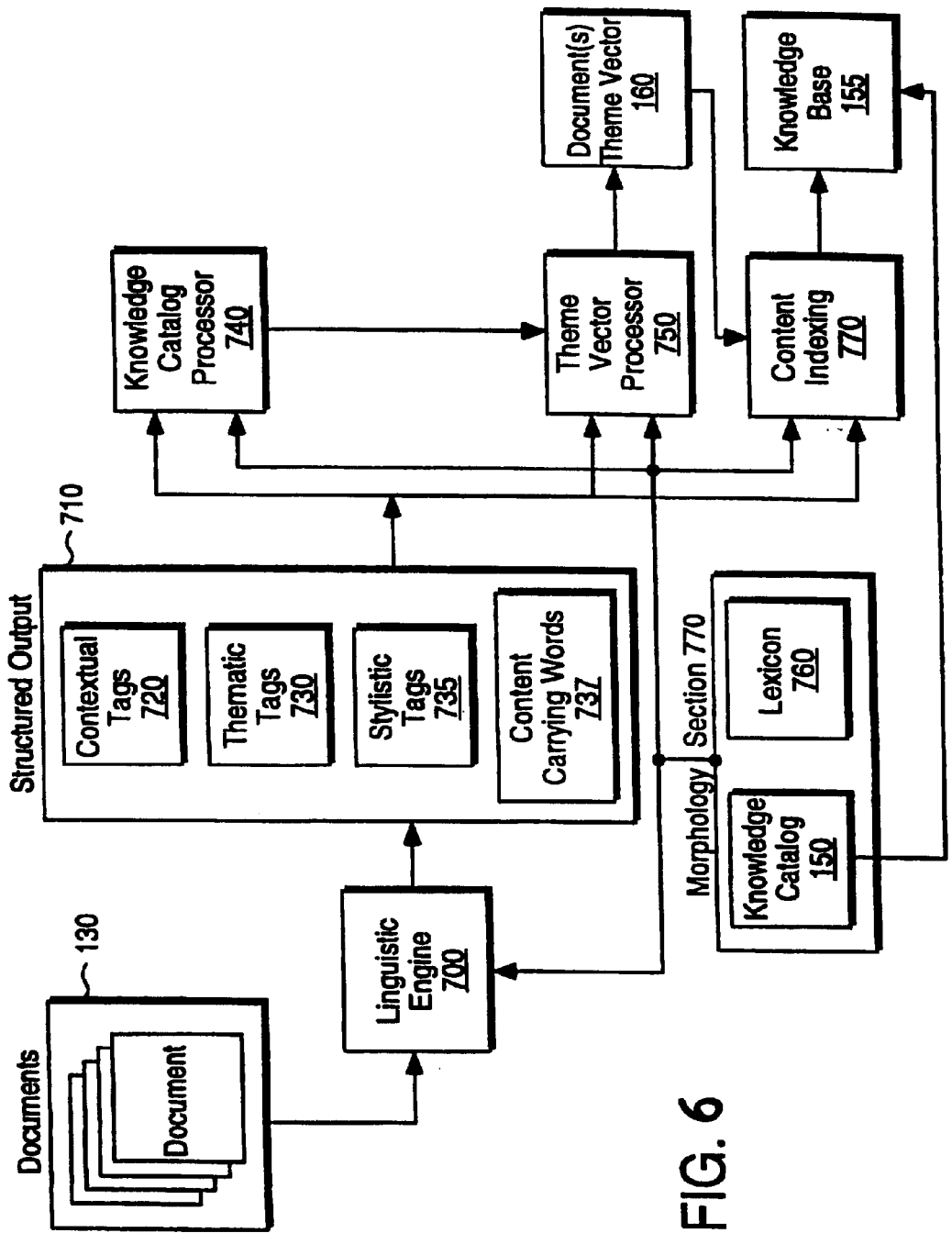
FIG. 6 is a block diagram illustrating one embodiment for a content processing system.

Document Themes:

FIG. 6 is a block diagram illustrating one embodiment for a content processing system. In general, the content processing system 110 analyzes the document set 130 and generates the document theme vectors 160. For this embodiment, the content processing system 110 includes a linguistic engine 700, a knowledge catalog processor 740, a theme vector processor 750, and a morphology section 770. The linguistic engine 700 receives, as input, the document set 130, and generates, as output, the structured output 710. The linguistic engine 700, which includes a grammar parser and a theme parser, processes the document set 130 by analyzing the grammatical or contextual aspects of each document, as well as analyzing the stylistic and thematic attributes of each document. Specifically, the linguistic engine 700 generates, as part of the structured output 710, contextual tags 720, thematic tags 730, and stylistic tags 735 that characterize each document. Furthermore, the linguistic engine extracts topics and content carrying words 737, through use of the thematic tags 730, for each sentence in the documents. For a detailed description of the contextual and thematic tags, see U.S. Pat. No. 5,694,523, inventor Kelly Wical, entitled "Content Processing for Discourse", filed May 31, 1995, that includes an Appendix D, entitled "Analysis Documentation."

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phases for each sentence in the documents, the context of the documents is defined. The chaos loop processor stores information in the form of the contextual tags 720. U.S. Pat. No. 5,694,523, inventor Kelly Wical, entitled "Content Processing System for Discourse", filed May 31, 1995, includes an Appendix C, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 130. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see Appendix E, entitled "Theme Parser for Text", of U.S. Pat. No. 5,694,523, inventor Kelly Wical, entitled "Content Processing System for Discourse", filed May 31, 1995.

As shown in FIG. 6, the morphology section 770 contains the knowledge catalog 150 and a lexicon 760. In one embodiment, the knowledge catalog 150 identifies categories for the document themes. For this embodiment, the knowledge catalog 150 contains categories, arranged in a hierarchy, that reflect a world view of knowledge. Although the present invention is described in conjunction with a knowledge catalog used to classify documents, any classification criteria that identifies topics or categories may be used in conjunction with the present invention without deviating from the spirit or scope of the invention.

In general, the lexicon 760 stores definitional characteristics for a plurality of words and terms. For example, the lexicon 212 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix B, entitled "Lexicon Documentation", of U.S. Pat. No. 5,694,523, inventor Kelly Wical, entitled "Content Processing System for Discourse", filed May 31, 1995.

The topics and content carrying words 737 are input to the knowledge catalog processor 740. In part, the knowledge catalog processor 740 processes the content carrying words for direct use with the knowledge catalog 150 and knowledge base 155. Specifically, the knowledge catalog processor 740 generates, as appropriate, the nominal or noun form of each content carrying word, as well as the count sense and mass sense of the word. Furthermore, the knowledge catalog processor 740 determines, from the knowledge catalog 150, which content carrying words are non ambiguous.

As shown in FIG. 6, the theme vector processor 750 receives the thematic tags 730 and contextual tags 720 from the structured output 710. In addition, the non-ambiguous content carrying words from the knowledge catalog processor 740 are input to the theme vector processor 750. The content carrying words may include single words or phrases. The content carrying words output from the knowledge catalog processor 240 are converted to the noun or nominal form. In general, the theme vector processor 750 presents a thematic profile of the content of each document (e.g., generates the document theme vector 160 including classifying the documents in the knowledge catalog 150. To accomplish this, the theme vector processor 750 determines the relative importance of the non ambiguous content carrying words in the document set.

In one embodiment, the theme vector processor 750 generates a list of theme terms, including words and phrases, and assigns a relative theme strength to each theme term. The theme vector processor 750, through use of the knowledge catalog 150, generates a theme concept for each theme term by mapping the theme terms to categories in the knowledge catalog 150. Thus, the theme concepts indicate a general topic or category in the knowledge catalog 150 to identify the content of each document. In addition, the theme vector processor 750 generates, for each theme term, an importance number, a theme strength, and an overall capacity weight of collective content importance.

Table 2 is an example document theme vector 160.

TABLE 2

| Document Themes | Theme Strength |
|---|---|
| Theme$_1$ | 190 |
| Theme$_2$ | 110 |
| Theme$_3$ | 70 |
| Theme$_4$ | 27 |
| . | . |
| . | . |
| . | . |
| Theme$_n$ | 8 |

As shown in Table 2, a document theme vector 160 for a document includes a list of document themes, indicated in Table 2 by Theme$_1$ –Theme$_n$. Each theme has a corresponding theme strength. The theme strength is calculated in the theme vector processor 750. The theme strength is a relative measure of the importance of the theme to the overall content of the document. For this embodiment, the larger the theme strength, the more important the theme is to the overall content of the document. The document theme vector 160 lists the document themes from the most important to the least important themes (e.g., theme$_1$—theme$_n$).

In one embodiment, the theme vector processor 750 executes a plurality of heuristic routines to generate the theme strengths for each theme. United U.S. Pat. No. 5,694,523, inventor Kelly Wical, entitled "Content Processing System for Discourse", contains source code to generate the theme strengths in accordance with one embodiment for theme vector processing. Also, a further explanation of generating a thematic profile is contained in U.S. Pat. No. 5,694,523, inventor Kelly Wical, entitled "Content Processing System for Discourse", filed May 31, 1995, which is herein incorporated by reference.

Figure 7:
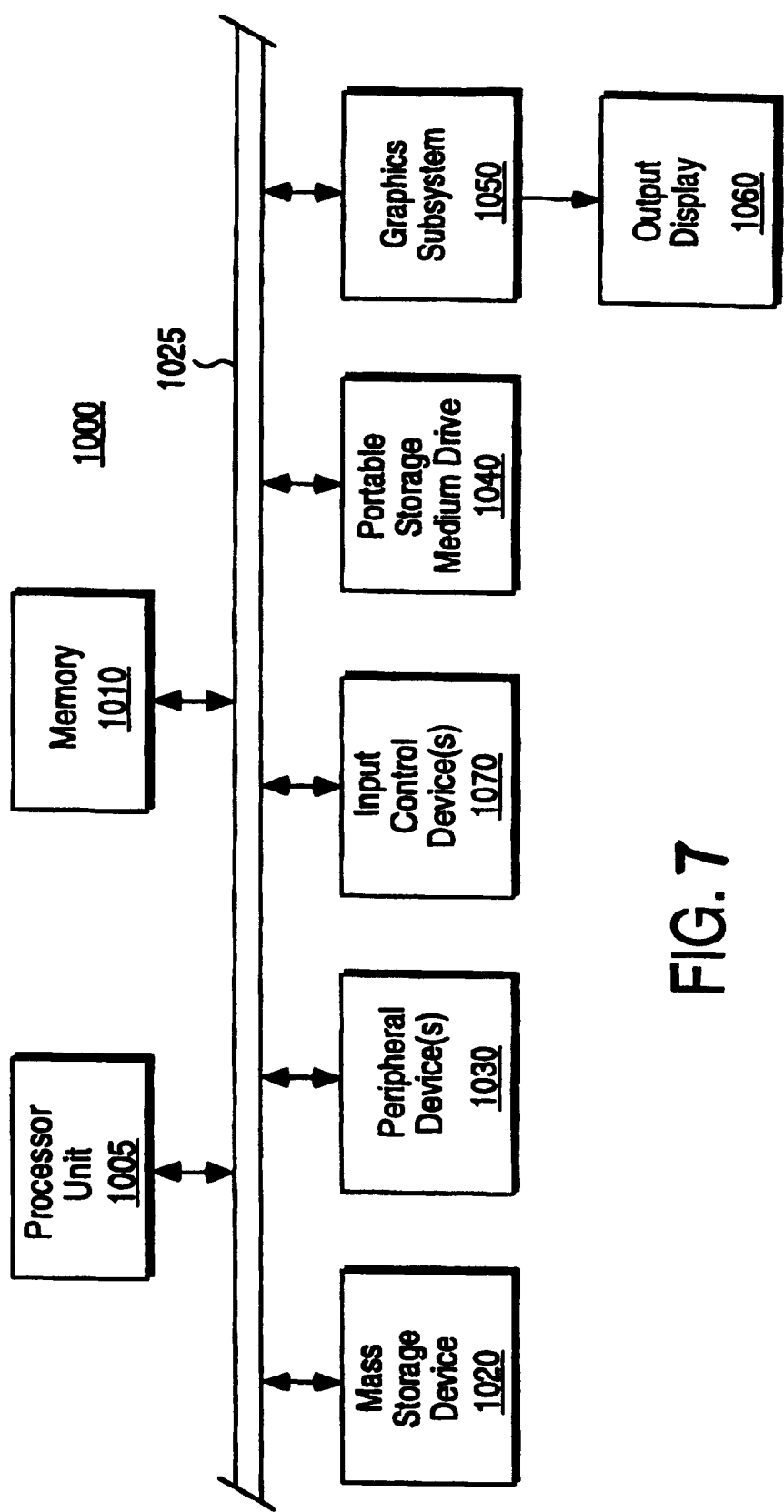
FIG. 7 illustrates a high-level block diagram of a general purpose computer system in which the knowledge base processing system of the present invention may be implemented.

Computer System:

FIG. 7 illustrates a high-level block diagram of a general purpose computer system in which the knowledge base processing system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the knowledge base processing system of the present invention is wholly or partially implemented in software, the main memory 1010 stores the executable code when in operation. The main memory 1010 may include banks of dynamic random access memory (DRAM) as well as high-speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 7 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the knowledge base processing system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the knowledge base processing system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents 130 may be input to the computer system 1000 via a portable storage medium or a network for processing by the knowledge base processing system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The knowledge base processing system may be implemented in either hardware or software. For the software implementation, the knowledge base processing system is software that includes a plurality of computer executable instructions for implementation on a general purpose computer system. Prior to loading into a general purpose computer system, the knowledge base processing system software may reside as encoded information on a computer readable medium, such as a magnetic floppy disk, magnetic tape, and compact disc read only memory (CD-ROM). In one hardware implementation, the knowledge base processing system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for generating cross-references among categories in a knowledge base, said method comprising the steps of:

extracting, from a plurality of documents, a plurality of themes, wherein a theme identifies subject matter contained in a corresponding document;
generating a theme strength for said themes, said theme strength reflects the amount of subject matter contained in a document for a corresponding theme relative to other themes in said document;
generating a plurality of scores, from said theme strengths, to identify a relative theme pair strength for at least one pair of said themes extracted from said documents;
selecting theme pairs based on said scores;
selecting category pairs in said knowledge base by mapping said themes of said theme pairs selected to corresponding categories of said knowledge base; and
generating a cross reference in said knowledge base between categories of said category pairs, wherein said cross reference identifies an association between said category pairs.

2. The method as set forth in claim 1, wherein the step of generating a plurality of scores comprises the steps of:
generating a matrix comprising a plurality of columns and rows to form a plurality of entries, wherein each column represents one of said themes and each row represents one of said themes; and
generating a score for at least a subset of said entries of said matrix, such that a score reflects a relative theme pair strength between two themes represented by said entry for said documents.

3. The method as set forth in claim 2, wherein the step of generating a score for at least a subset of said entries of said matrix comprises the steps of:
calculating a plurality of products for an entry by multiplying theme strengths corresponding to two themes represented by said entry for each document that includes said two themes represented by said entry; and
summing said products for an entry to generate said score.

4. The method as set forth in claim 1, wherein the step of selecting category pairs in said knowledge base comprises the steps of:
determining whether only one of said themes exist as a category in said knowledge base;
if so,
generating a new category in said knowledge base for said theme;
generating a new cross-reference relationship between said new category and a category for which one of said themes exist; and
generating a new score for said new cross-reference relationship.

5. The method as set forth in claim 1, wherein the step of selecting category pairs in said knowledge base comprises the steps of:
determining whether both of said themes exist as categories in said knowledge base;
if so,
determining whether a cross reference relationship exists from said category pair;
if not,
generating a new cross-reference relationship between said category pair;
generating a new score for said new cross-reference relationship; and
if so,
generating a new score for said existing cross-reference relationship.

6. A system comprising:
search and retrieval module for receiving a user query and for generating a query response including query feedback;
a knowledge base, coupled to said search and retrieval module, for storing relationships among terminology for use as query feedback;
a knowledge base processing system, coupled to said knowledge base for processing a plurality of documents and automatically extending said relationships among said terminology in said knowledge base, said knowledge base processing system for extracting, from said documents, a plurality of themes, wherein a theme identifies subject matter contained in a corresponding document, for generating a theme strength for said themes, said theme strength reflects the amount of subject matter contained in a document for a corresponding theme relative to other themes in said document, for generating a plurality of scores, from said theme strengths, to identify a relative theme pair strength for at least one pair of said themes extracted from said documents, for selecting theme pairs based on said scores, for selecting category pairs in said knowledge base by mapping said themes of said theme pairs selected to corresponding categories of said knowledge base, and for generating a cross reference in said knowledge base between categories of said category pairs, wherein said cross reference identifies an association between said category pairs.

7. The system as set forth in claim 6, wherein the knowledge base processing system further for generating a matrix comprising a plurality of columns and rows to form a plurality of entries, wherein each column represents one of said themes and each row represents one of said themes and for generating a score for at least a subset of said entries of said matrix, such that a score reflects a relative theme pair strength between two themes represented by said entry for said documents.

8. The system as set forth in claim 7, wherein the knowledge base processing system further for calculating a plurality of products for an entry by multiplying theme strengths corresponding to two themes represented by said entry for each document that includes said two themes represented by said entry, and for summing said products for an entry to generate said score.

9. The system as set forth in claim 7, wherein the knowledge base processing system further for determining whether only one of said themes exist as a category in said knowledge base, if so, for generating a new category in said knowledge base for said theme, for generating a new cross-reference relationship between said new category and a category for which one of said themes exist, and for generating a new score for said new cross-reference relationship.

10. The system as set forth in claim 7, wherein the knowledge base processing system further for determining whether both of said themes exist as categories in said knowledge base; if so, for determining whether a cross reference relationship exists from said category pair; if not, for generating a new cross-reference relationship between said category pair, for generating a new score for said new cross-reference relationship; and if so, for generating a new score for said existing cross-reference relationship.

11. A computer readable medium comprising a plurality of instructions, which when executed, causes the computer to perform the steps of:

extracting, from a plurality of documents, a plurality of themes, wherein a theme identifies subject matter contained in a corresponding document;

generating a theme strength for said themes, said theme strength reflects the amount of subject matter contained in a document for a corresponding theme relative to other themes in said document;

generating a plurality of scores, from said theme strengths, to identify a relative theme pair strength for at least one pair of said themes extracted from said documents;

selecting theme pairs based on said scores;

selecting category pairs in said knowledge base by mapping said themes of said theme pairs selected to corresponding categories of said knowledge base; and generating a cross reference in said knowledge base between categories of said category pairs, wherein said cross reference identifies an association between said category pairs.

12. The computer readable medium as set forth in claim 11, wherein the step of generating a plurality of scores comprises the steps of:

generating a matrix comprising a plurality of columns and rows to form a plurality of entries, wherein each column represents one of said themes and each row represents one of said themes; and generating a score for at least a subset of said entries of said matrix, such that a score reflects a relative theme pair strength between two themes represented by said entry for said documents.

13. The computer readable medium as set forth in claim 12, wherein the step of generating a score for at least a subset of said entries of said matrix comprises the steps of:

calculating a plurality of products for an entry by multiplying theme strengths corresponding to two themes represented by said entry for each document that includes said two themes represented by such entry; and summing said products for an entry to generate said score.

14. The computer readable medium as set forth in claim 11, wherein the step of selecting category pairs in said knowledge base comprises the steps of:

determining whether only one of said themes exist as a category in said knowledge base;

if so, generating a new category in said knowledge base for said theme;

generating a new cross-reference relationship between said new category and a category for which one of said themes exist; and generating a new score for said new cross-reference relationship.

15. The computer readable medium as set forth in claim 11, wherein the step of selecting category pairs in said knowledge base comprises the steps of:

determining whether both of said themes exist as categories of said knowledge base;

if so, determining whether a cross reference relationship exists from said category pair;

if not, generating a new cross-reference relationship between said category pair;

generating a new score for said new cross-reference relationship; and if so, generating a new score for said existing cross-reference relationship, if not, generating a new cross-reference relationship between said category pair;

generating a new score for said new cross-reference relationship; and if so, generating a new score for said existing cross-reference relationship.

* * * * *